United States Patent
Longueville et al.

(10) Patent No.: US 7,389,845 B2
(45) Date of Patent: Jun. 24, 2008

(54) MACHINE CONTROL APPARATUS AND METHOD

(75) Inventors: Liesbeth M. Longueville, Erpe-Mere (BE); Patrick J. Haest, Nalinnes (BE)

(73) Assignee: Caterpillar Inc., Peoria, IL (US)

( * ) Notice: Subject to any disclaimer, the term of this patent is extended or adjusted under 35 U.S.C. 154(b) by 429 days.

(21) Appl. No.: 10/755,661

(22) Filed: Jan. 12, 2004

(65) Prior Publication Data
US 2004/0256898 A1 Dec. 23, 2004

(30) Foreign Application Priority Data
Jun. 23, 2003 (EP) .................... 03014029

(51) Int. Cl.
*B60K 26/00* (2006.01)

(52) U.S. Cl. ........................ 180/326; 180/334

(58) Field of Classification Search ................ 180/326, 180/315, 324, 333, 329–331, 334; 297/411.2, 297/411.3, 411.31, 411.32, 411.33, 411.34, 297/411.35, 411.36, 411.37, 411.4
See application file for complete search history.

(56) References Cited

U.S. PATENT DOCUMENTS

| | | | | |
|---|---|---|---|---|
| 3,829,159 A | * | 8/1974 | Leffler | 297/411.31 |
| 4,165,901 A | * | 8/1979 | Swenson et al. | 297/411.33 |
| 4,200,166 A | | 4/1980 | Hansen | |
| 4,244,623 A | * | 1/1981 | Hall et al. | 297/411.36 |
| 4,307,913 A | * | 12/1981 | Spiegelhoff | 297/411.33 |
| 4,478,308 A | | 10/1984 | Klaassen | |
| 5,286,078 A | | 2/1994 | Mottino et al. | |
| 5,366,036 A | * | 11/1994 | Perry | 180/65.1 |
| 5,592,997 A | * | 1/1997 | Ball | 180/65.1 |
| 5,612,718 A | * | 3/1997 | Bryan | 345/168 |
| 5,617,929 A | * | 4/1997 | Richardson et al. | 180/326 |
| 5,666,861 A | | 9/1997 | Fee et al. | |
| 5,924,515 A | | 7/1999 | Stauffer | |
| 5,938,282 A | | 8/1999 | Epple | |
| 6,039,141 A | | 3/2000 | Denny | |
| 6,065,560 A | | 5/2000 | Palmeri et al. | |
| 6,971,194 B2 | * | 12/2005 | McClelland et al. | 37/347 |

FOREIGN PATENT DOCUMENTS

| | | |
|---|---|---|
| DE | 19933429 | 1/2001 |
| EP | 0911548 | 4/1999 |
| EP | 1122367 | 8/2001 |

* cited by examiner

*Primary Examiner*—Ruth Ilan
*Assistant Examiner*—Drew J. Brown
(74) *Attorney, Agent, or Firm*—Finnegan, Henderson, Farabow, Garrett & Dunner

(57) ABSTRACT

An apparatus and method for controlling selected functions of a machine is provided. The machine includes a seat having at least one armrest supportably positionable adjacent to the seat. An interface module has a connecting portion connectable to the armrest and adapted to shift a working portion laterally between a retracted position and an extended position relative to the armrest. This permits placing the interface module in either a stored mode or a working mode such that it is available to an operator as needed and conveniently out of the way when not needed.

21 Claims, 4 Drawing Sheets

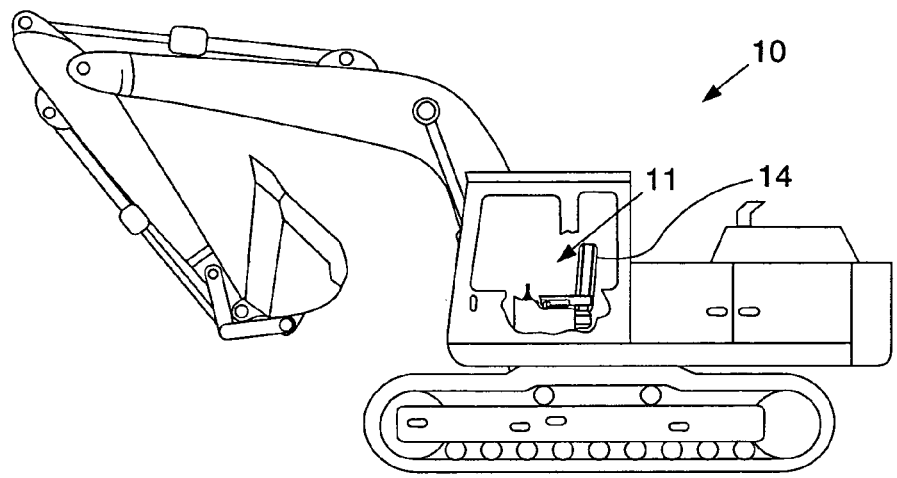
Fig_1_
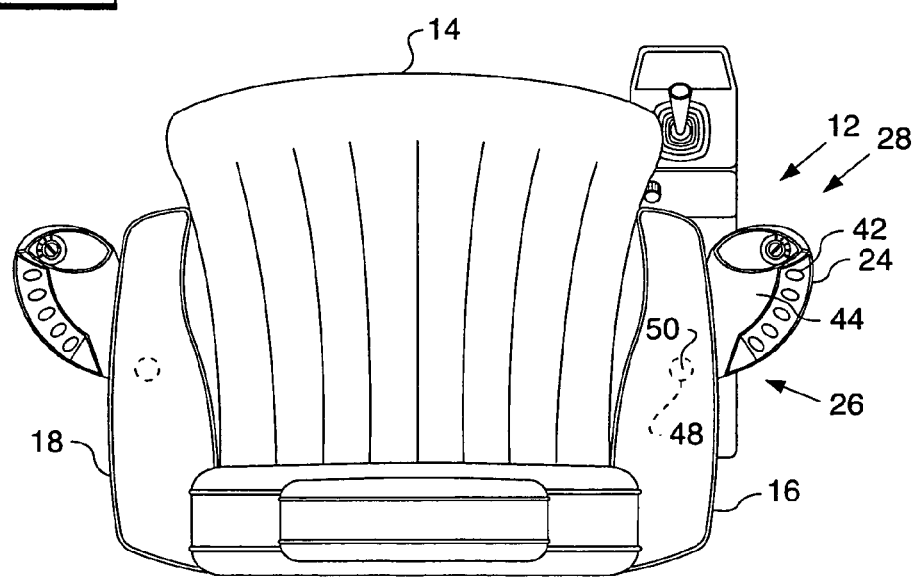
Fig_2_

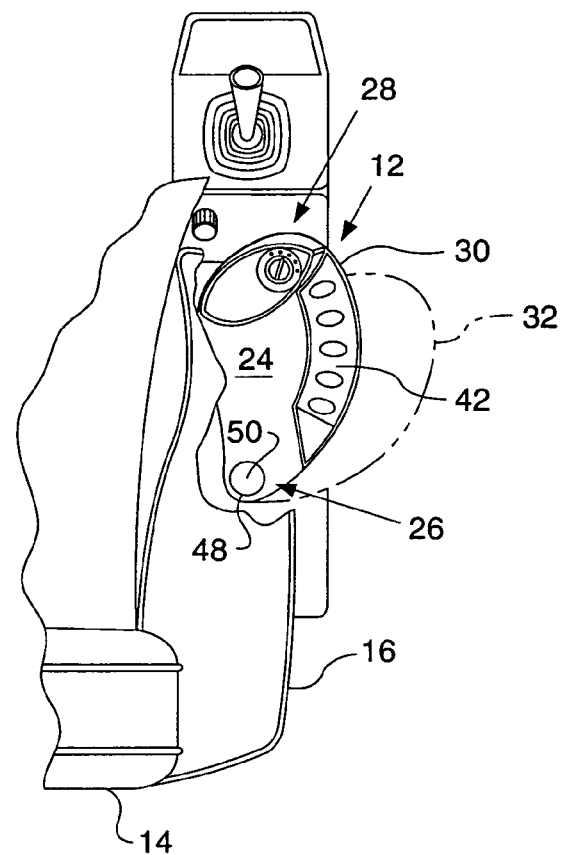
Fig_3_
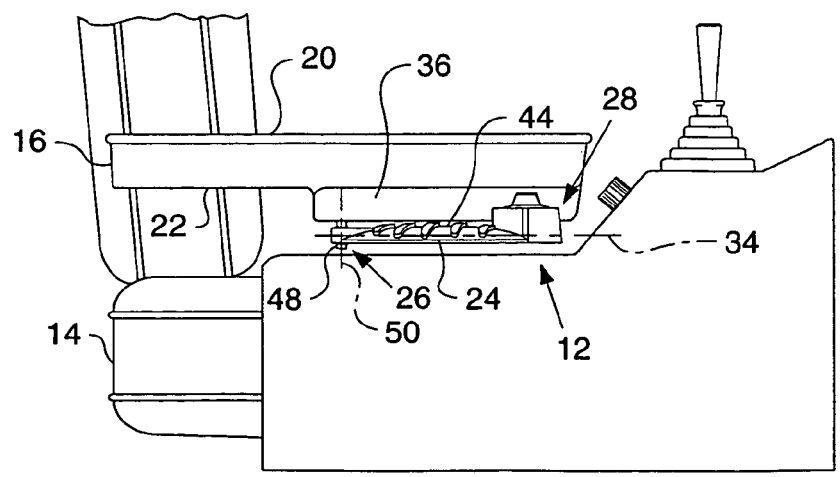
Fig_4_

Fig-5-
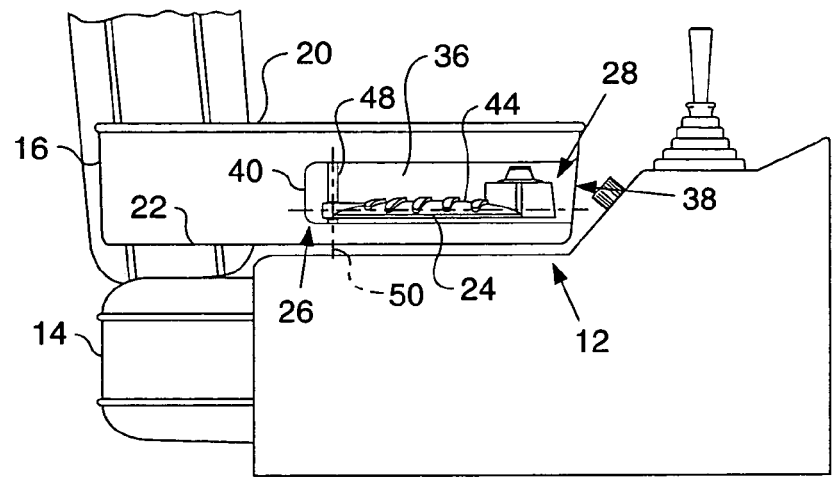
Fig-6-
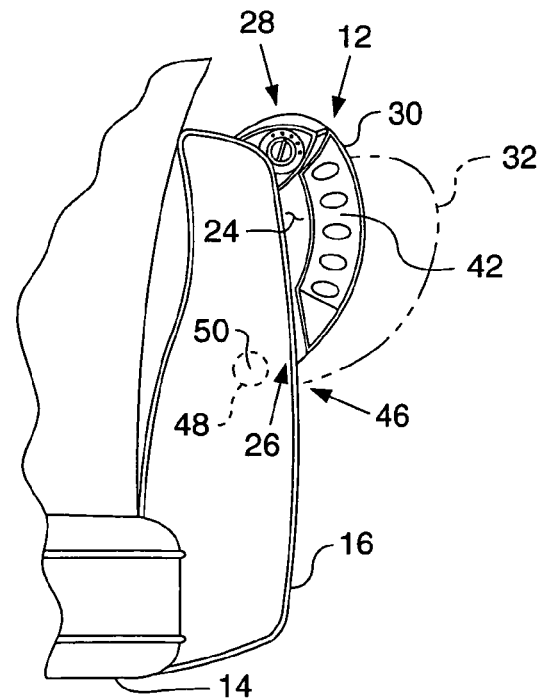

MACHINE CONTROL APPARATUS AND METHOD

TECHNICAL FIELD

The present invention relates generally to an apparatus for controlling a machine and, more particularly, to an apparatus and method for controlling a machine using a movable interface module.

BACKGROUND

A variety of machines include operator interface modules that are provided with various actuating devices to enable a machine operator to engage and disengage various elements of the machine. For example, industrial work machines such as hydraulic excavators typically include clusters of switches, indicators, and other devices positioned for convenient use by an operator to control the various functions associated with the excavator. Quite commonly, such interface modules are integrated into an armrest associated with an operator seat. Such an arrangement facilitates ready access by the operator in a functionally efficient manner.

One example of a machine having such an operator interface can be seen in U.S. Pat. No. 5,938,282 issued on 17 Aug. 1999 to Agco GmbH & Co. This patent discloses a control device for use with a vehicle. The control device is located on and near the front of the armrest of an operator's seat and includes control members to control various functions of the vehicle.

Similar operator interface modules can be used with other machines and vehicles that include an operator seat, for example, agricultural tractors, various types of earthmoving equipment, aircraft, lift trucks, and motorized personal vehicles such as wheelchairs and golf carts.

Because these operator interface modules are mounted on and associated with an armrest which is typically part of or mounted adjacent to the operator seat, they are conveniently positioned for comfortable and efficient use by the operator. However, they also may often be in the way of the operator or maintenance personnel under certain circumstances. Likewise, because these interface modules may extend in various directions from the operator armrest, they may be subject to damage at times when they are not being used to control the machine.

The present invention is directed to overcoming one or more of the problems set forth above.

SUMMARY OF THE INVENTION

In a first aspect of the present invention, a device is provided for controlling selected functions of a machine. The machine includes a seat having at least one armrest supportably positionable adjacent to the seat. An interface module has a connecting portion connectable to the armrest and adapted to shift a working portion laterally between a retracted and extended position.

In a second aspect of the present invention, a method is provided for controllably interacting with a machine having a seat and at least one armrest supportably positionable adjacent to the seat. The method includes the steps of providing an interface module having a connecting portion and a working portion, in which the connecting portion is connected to the armrest. The method further includes the steps of selecting an interface module working portion stored mode by moving the interface module working portion laterally toward the armrest until the working portion is at least partially concealed by the armrest, and selecting an interface module working portion working mode by moving the interface module working portion laterally away from the armrest until the working portion is substantially free from obstruction by the armrest.

BRIEF DESCRIPTION OF THE DRAWINGS

FIG. 1 is a plan view of a machine suitable for use with an embodiment of the present invention;

FIG. 2 is a top view of an exemplary embodiment of the present invention;

FIG. 3 is a more detailed top view of the embodiment illustrated in FIG. 2;

FIG. 4 is a side view of a particular exemplary embodiment of the present invention;

FIG. 5 is a side view of another exemplary embodiment of the present invention;

FIGS. 6 through 8 are top views of three exemplary embodiments of the present invention.

DETAILED DESCRIPTION

Figure 7:
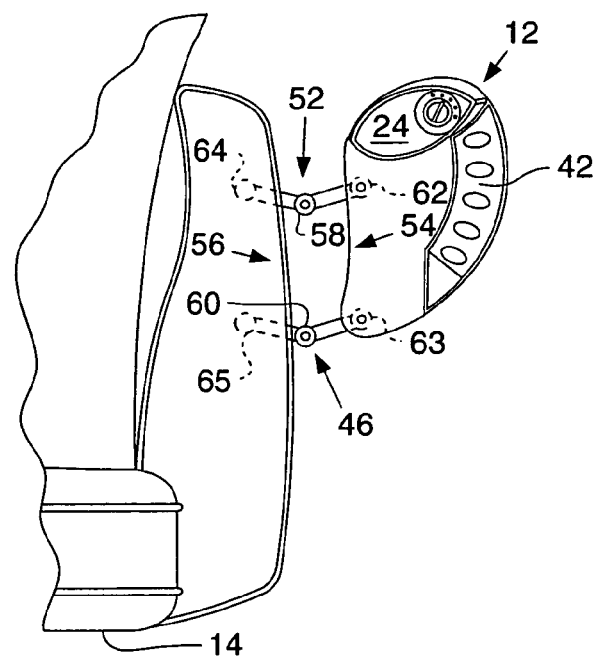

An exemplary embodiment of a machine 10 is illustrated in FIG. 1, the machine 10, for example, an earthmoving machine such as a hydraulic excavator, includes an operator station 11. The operator station 11 includes a seat 14 arranged as is customary to position an operator appropriately for controlling the machine 10.

As illustrated in FIG. 2, the seat 14 is provided with armrests 16, 18 that are supportably positionable adjacent to the seat 14. The armrests include upper surface portions 20 and lower surface portions 22. The armrests 16, 18 are typically integral with the seat 14 but, in some configurations, may be separate from the seat 14. In either instance, the armrests 16, 18 are positioned at such a location and in such an orientation as to provide convenient support for an operator's arms.

As is also shown in FIG. 2, a device 12 for controlling selected functions of the machine 10 is provided in cooperative arrangement with at least one of the armrests 16, 18. In the exemplary embodiment shown, the device 12 includes an interface module 24 having a connecting portion 26 and a working portion 28. The connecting portion 26 is connectable to at least one of the armrests 16, 18 in a manner sufficient to allow the working portion 28 to shift or pivot laterally between a retracted position 30 and an extended position 32 relative to the respective armrest 16, 18.

The interface module 24 may include a plurality of actuating devices 42 that may be associated with respective machine functions. The actuating devices 42 may include any desired combination of switches, for example, pushbutton, lever, or rotary switches, and gauges or indicator lights. The switches or indicators may be associated with various elements of the machine 10 such that an operator is able to control the respective functions of the machine 10.

The working portion 28 of the interface module 24 may include an upwardly convex generally ovoid surface 44 and the actuating devices 42 may be arranged on the surface 44 at respective locations selected to facilitate manual manipulation of the actuating devices 42 by an operator. This exemplary embodiment is selected to provide an ergonomically comfortable arrangement such that an operator's hand may fit comfortably on the ovoid surface 44 while the operator's arm is supported by an armrest 16, 18. In this position, the operator's fingers are positioned for ready manipulation of the actuating devices 42.

As illustrated in FIG. 3, when in the retracted or stored position 30 the interface module working portion 28 is at least partially concealed by the armrest 16, 18, and in the extended or working position 32 the interface module working portion 28 is substantially free from obstruction by the armrest 16, 18.

FIG. 4 illustrates an exemplary embodiment of the device 12 in which the working portion 28 may move or pivot laterally between the retracted and extended positions 30, 32 along a first plane 34 that extends generally horizontally below the armrest lower surface portion 22. The first plane 34 is located at an elevational position sufficient that the working portion 28 is at least partially located below the armrest lower surface portion 22 when the working portion 28 is in the retracted position 30.

The armrest lower surface portion 22 may advantageously include a blocking portion 36. The blocking portion 36 may extend outwardly from the lower surface portion 22 at a location sufficient to limit retraction of the interface module 24 to a predetermined amount, such that a portion of the interface module working portion 28 remains free from obstruction by the armrest 16, 18 even when the working portion 28 is in the retracted position 30. In the particular embodiment shown, the blocking portion 36 extends substantially perpendicularly outward (downward) from the lower surface portion 22, although any configuration sufficient to interrupt the lateral motion of the interface module 24 at a preselected retracted position could readily be employed.

A modified embodiment of the device 12 is illustrated in FIG. 5, in which the armrest 16, 18 is modified to include a hollow region 38 located between the upper and lower surface portions 20, 22. In this embodiment, the interface module 24 may move or pivot laterally between the retracted and extended positions 30, 32 along a second plane 40 that extends generally horizontally through the hollow region 38 and at an elevational position sufficient that the interface module working portion 28 is at least partially located within the hollow region 38 when the working portion 28 is in the retracted position 30.

Figure 8:
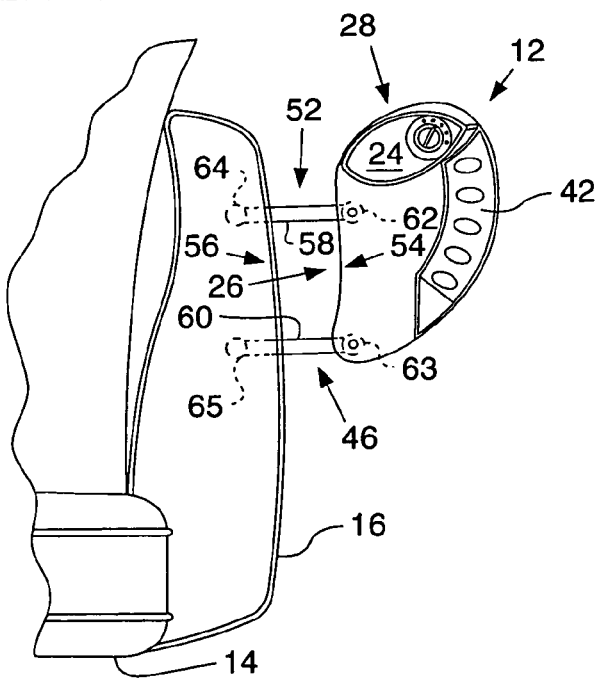

The interface module connecting portion 26 includes a connecting mechanism 46 adapted to pivotally interconnect the connecting portion 26 and the armrest 16, 18. The connecting mechanism 46 may take various forms, some of which are illustrated in FIGS. 6-8. Each of these Figs. illustrates a particular structural arrangement of a connecting mechanism 46, although other satisfactory arrangements may be employed as will be appreciated by one skilled in the art of such devices. For example, the interface module 24 could be slidably supported on tracks or nails such that it could be shifted laterally between the retracted and extended positions 30,32 without pivoting.

As illustrated in FIG. 6, the connecting mechanism 46 may include a pivot pin 48 connectably engageable with the interface module connecting portion 26 and the armrest 16, 18 along an axis of rotation 50 that is substantially perpendicular to the respective armrest surface portion 20, 22.

As illustrated in FIG. 7, the interface module connecting mechanism 46 may include a linkage 52 having a first end portion 54 connectable to the interface module connecting portion 26 and a second end portion 56 connectable to the armrest 16, 18.

The linkage 52 may include at least first and second link arms 58, 16. In the illustrative embodiment, each of the first and second link arms 58, 60 are spaced apart one from the other and have first end portions 62, 63 that are pivotally connectable to the interface module connecting portion 26 and second end portions 64, 65 that are pivotally connectable to the armrest 16, 18. The embodiment illustrated in FIG. 7 shows the first and second link arms 58, 60 having a pivot joint positioned between the respective end portions 62, 63, 64, 65, while the embodiment illustrated in FIG. 8 shows the first and second link arms 58, 60 as solid links.

Regardless of the particular structural configuration, each of the illustrated embodiments of the connecting mechanism 46 are sufficient to pivotally interconnect the interface module connecting portion 26 and a respective armrest 16, 18. As one skilled in the art will immediately recognize, it is a simple matter of selecting appropriately configured interface modules 24 to provide either right hand or left hand configurations that may be associated with either a right hand or left hand armrest 16, 18, as may be desirable for a particular machine 10 configuration.

INDUSTRIAL APPLICABILITY

The device 12 may be advantageously employed for controlling selected functions of a machine 10 in which an operator is typically seated at an operator station 11. It is desirable that the operator have a comfortable and efficient working environment and that the devices necessary to control the machine 10 be conveniently at hand.

With the operator seated and the operator's arm positioned along the armrest upper surface portion 20, the interface module 24 may be placed in a working mode by moving or pivoting it to the extended position 32. In this position, the operator's hand will naturally and comfortably be supportable by the ovoid surface 44 of the working portion 28 and the actuating devices 42 will be conveniently positioned for manipulation by the operator.

At those times when the operator has no need to access the actuating devices 42, the interface module 24 may be readily placed in a stored mode by moving or pivoting it to the retracted position 30 in which it is located at least partially beneath or within the armrest 16, 18. The blocking portion 36 may be constructed and positioned to limit retraction of the interface module 24 to whatever extent may be desired as appropriate for the particular machine 10. In the retracted position 30 the interface module 24 is both out of the way of the operator and of service and maintenance personnel and is protected from accidental damage. In this manner, the operator's station is well organized and space is used efficiently. At the same time, the interface module 24 may be quickly pivoted to the extended position when it is again desired to have access to the actuating devices 42.

As is apparent from the foregoing description, illustrated embodiments of the present invention provide a convenient, ergonomic, and efficient device 12 for controlling selected functions of a machine 10. Although the illustrated machine 10 is an earthworking machine such as a hydraulic excavator, the described device 12 may be successfully applied to any machine having an operator's station, for example, a personal transport vehicle such as an automobile, golf cart, electric wheelchair, and to other machines such as aircraft and military equipment.

As will also be apparent to those skilled in the art, modifications and variations of the apparatus and method described above can be made without departing from the true scope of the invention. It is likely that other embodiments beyond those described above will become apparent to those skilled in the art after consideration of the foregoing specification. Consequently, it is intended that the specification, embodiment, and examples set forth above be considered as exemplary only, with the true scope of the invention defined by the appended claims and equivalents.

What is claimed is:

1. A device configured to control select functions of a machine, said machine including a seat and at least one armrest associated with said seat, said at least one armrest being supportably positionable adjacent to said seat, said device comprising:

an interface module having a connecting portion and a working portion, said interface module connecting portion being configured to be pivotally connected directly to said at least one armrest associated with the seat in the machine and adapted to shift said working portion laterally between a retracted position and an extended position relative to said at least one armrest such that, in said retracted position, said interface module working portion is at least partially positioned below at least a portion of said at least one armrest.

2. A device, as set forth in claim 1, wherein in said extended position, said interface module working portion is substantially free from obstruction by said at least one armrest.

3. A device, as set forth in claim 2, wherein the at least one armrest includes upper and lower surface portions; and said interface module working portion moves laterally between said retracted and extended positions along a first plane extending generally horizontally below said at least one armrest lower surface portion and at an elevational position sufficient that said interface module working portion is at least partially located below said at least one armrest lower surface portion when said interface module working portion is in said retracted position.

4. A device, as set forth in claim 3, wherein said at least one armrest lower surface portion includes a blocking portion extending substantially perpendicularly outward from said lower surface portion at a location sufficient to limit retraction of said interface module to a predetermined amount, leaving a portion of said interface module working portion free from obstruction by said at least one armrest when said working portion is in said retracted position.

5. A device, as set forth in claim 1, wherein said at least one armrest includes upper and lower surface portions and a hollow region located between said upper and lower surface portions; and said interface module moves laterally between said retracted and extended positions along a second plane extending generally horizontally through said hollow region and at an elevational position sufficient that said interface module working portion is at least partially located within said hollow region when said working portion is in said retracted position.

6. A device, as set forth in claim 1, wherein said interface module includes a plurality of actuating devices associated with respective machine functions;

said working portion of said interface module includes an upwardly convex generally ovoid surface; and said plurality of actuating devices are arranged on said upwardly convex generally ovoid surface at respective locations selected to facilitate manual manipulation of said actuating devices.

7. A device, as set forth in claim 1, including an interface module connecting mechanism adapted to interconnect said interface module connecting portion and said at least one armrest.

8. A device, as set forth in claim 7, wherein the at least one armrest includes upper and lower surface portions; and said interface module connecting mechanism includes a pivot pin connectably engagable with said interface module connecting portion and said at least one armrest along an axis of rotation substantially perpendicular to said at least one of the armrest surface portions.

9. A device, as set forth in claim 7, wherein said interface module connecting mechanism includes a linkage having a first end portion connectable to said interface module connecting portion and a second end portion connectable to said at least one armrest.

10. A device, as set forth in claim 9, wherein said linkage includes at least first and second link arms, each of said first and second link arms being spaced apart one from the other and having first end portions pivotally connectable to said interface module connecting portion and second end portions pivotally connectable to said at least one armrest.

11. A device, as set forth in claim 1, wherein said seat includes left-hand and right-hand armrests, each of said at least one armrests including an interface module having one of a left-hand and right-hand configuration determined in response to the respective left-hand and right-hand position of the associated armrest.

12. The device of claim 1, wherein the interface module connecting portion includes a connecting mechanism configured to pivotally interconnect the interface module connecting portion to the at least one armrest.

13. The device of claim 1, wherein when the interface module connecting portion is pivotally connected directly to the at least one armrest, the interface module working portion in the retracted position is at least partially positioned below at least a portion of the at least one armrest.

14. A method for controllably interacting with a machine, said machine including a seat having at least one armrest supportably positionable adjacent to said seat, comprising the steps of:

providing an interface module having a connecting portion and a working portion;

pivotally connecting said interface module connecting portion to said at least one armrest;

selecting an interface module working portion stored mode by moving said interface module working portion laterally toward said at least one armrest until said working portion is at least partially covered by at least a portion of said at least one armrest; and selecting an interface module working portion working mode by moving said interface module working portion laterally away from said at least one armrest until said working portion is substantially free from obstruction by said at least one armrest.

15. The method of claim 14, wherein the at least one armrest includes upper and lower surface portions, and moving the interface module working portion laterally toward the at least one armrest includes:

moving the interface module working portion laterally along a first plane extending generally horizontally below the at least one armrest lower surface portion and at an elevational position that permits the interface module working portion to be at least partially located below the at least one armrest lower surface portion when the interface module working portion is at least partially covered by the at least one armrest.

16. The method of claim 14, wherein moving of the interface module working portion laterally toward or laterally away from the at least one armrest includes:

moving the interface module within a predetermined range of motion such that a portion of the interface module working portion is free from obstruction by the at least one armrest when the working portion is in the retracted position.

17. The method of claim 14, wherein said at least one armrest includes upper and lower surface portions and a hollow region located between said upper and lower surface portions, and moving of the interface module working portion laterally toward or laterally away from the at least one armrest includes:

moving the interface module laterally between the retracted and extended positions along a second plane extending generally horizontally through the hollow region and at an elevational position that permits the interface module working portion to be at least partially located within the hollow region when the working portion is in the retracted position.

18. A machine, comprising:

an operator's station, said operator's station including a seat having at least one armrest, said at least one armrest having an upper and lower surface portion and being supportably positionable adjacent to said seat;

an interface module having a connecting portion and a working portion; and wherein said interface module connecting portion is connectable to said at least one armrest and is adapted to move laterally between a retracted position wherein at least a portion of the at least one armrest extends over at least a portion of said working portion and an extended position wherein said working portion is substantially free from obstruction by said at least one armrest.

19. The machine of claim 18, wherein:

the at least one armrest includes upper and lower surface portions; and the interface module working portion moves laterally between the retracted and extended positions along a first plane extending generally horizontally below the at least one armrest lower surface portion and at an elevational position that permits the interface module working portion to be at least partially located below the at least one armrest lower surface portion when the interface module working portion is in the retracted position.

20. The machine of claim 19, wherein the at least one armrest lower surface portion includes a blocking portion extending substantially perpendicularly outward from the lower surface portion at a location that limits retraction of the interface module by a predetermined amount, thereby leaving a portion of the interface module working portion free from obstruction by the at least one armrest when the working portion is in the retracted position.

21. The machine of claim 18, wherein:

the at least one armrest includes upper and lower surface portions and a hollow region located between the upper and lower surface portions; and the interface module moves laterally between the retracted and extended positions along a second plane extending generally horizontally through the hollow region and at an elevational position that permits the interface module working portion to be at least partially located within the hollow region when the working portion is in the retracted position.

* * * * *